United States Patent [19]

Orlandea et al.

[11] 4,355,697
[45] Oct. 26, 1982

[54] VEHICULAR STEERING AND SUSPENSION SYSTEM

[75] Inventors: Nicolae V. Orlandea, Davenport, Iowa; Jack C. Wiley, Moline, Ill.

[73] Assignee: Deere & Company, Moline, Ill.

[21] Appl. No.: 183,536

[22] Filed: Sep. 2, 1980

[51] Int. Cl.³ .................................... B60K 17/30
[52] U.S. Cl. ............................................ 180/261
[58] Field of Search ............... 180/261, 262, 260, 255, 180/254

[56] References Cited

U.S. PATENT DOCUMENTS

| | | | |
|---|---|---|---|
| 906,936 | 12/1908 | Rose | 180/261 X |
| 1,274,841 | 8/1918 | Bangs | 180/254 |
| 1,856,075 | 5/1932 | Holmquist | 180/261 |
| 2,189,695 | 2/1940 | Alden | 180/254 |
| 2,716,899 | 9/1955 | Lado | 180/261 |
| 3,351,037 | 11/1967 | Meili | 180/255 X |
| 3,703,216 | 11/1972 | Thibodeau et al. | 180/254 X |
| 4,209,072 | 1/1980 | Orlandea et al. | 180/245 |

FOREIGN PATENT DOCUMENTS 333183  6/1903  France ............................. 180/261

Primary Examiner—John A. Pekar

[57] ABSTRACT

This invention relates to an improved steering and suspension system for use on off-road type vehicles. The system comprises a gear train at each drive wheel made up of three gears: an input gear, an intermediate gear and an output gear. The input gear is mounted on a driven output shaft which extends out of the differential of the vehicle. The output gear is mounted on an outwardly extending shaft which is retained in a gear case which surrounds the entire gear train. Rotatably attached to this gear case is a tubular hub with a pivotally attached yoke. The yoke supports the axle on which the drive wheel is mounted. Positioned within the area defined by the tubular hub and the yoke are two pairs of intermeshing bevel gears. These bevel gears unite the outwardly extending shaft with the axle and allow torque to be transmitted from the engine of the vehicle to the drive wheels. Also included in this system are two pivotally connected arms which unite the tubular hub to the frame of the vehicle. These two linkage arms cooperate with attached actuating and suspension means to retain the pivot axis of the yoke in an upright position.

23 Claims, 8 Drawing Figures

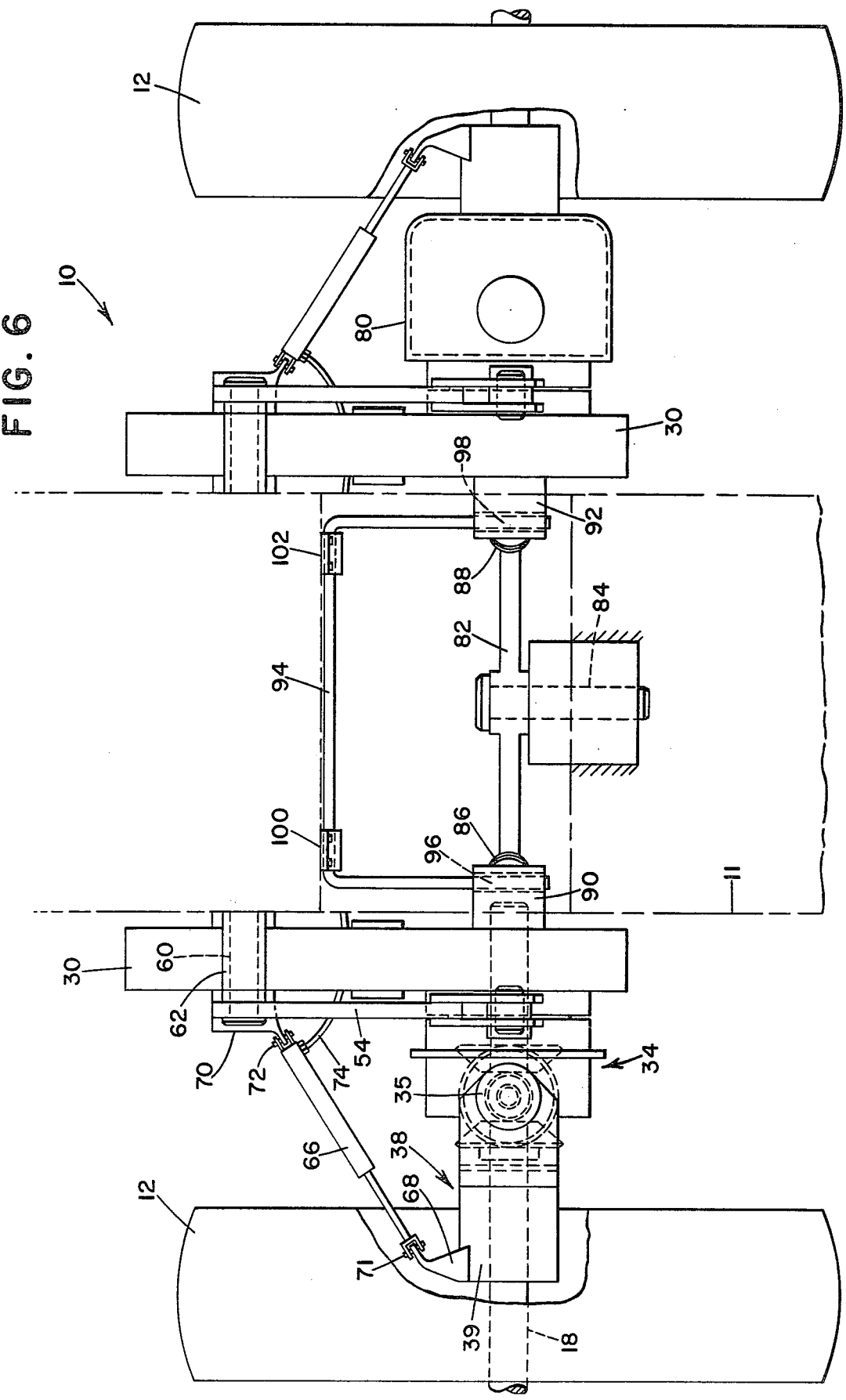

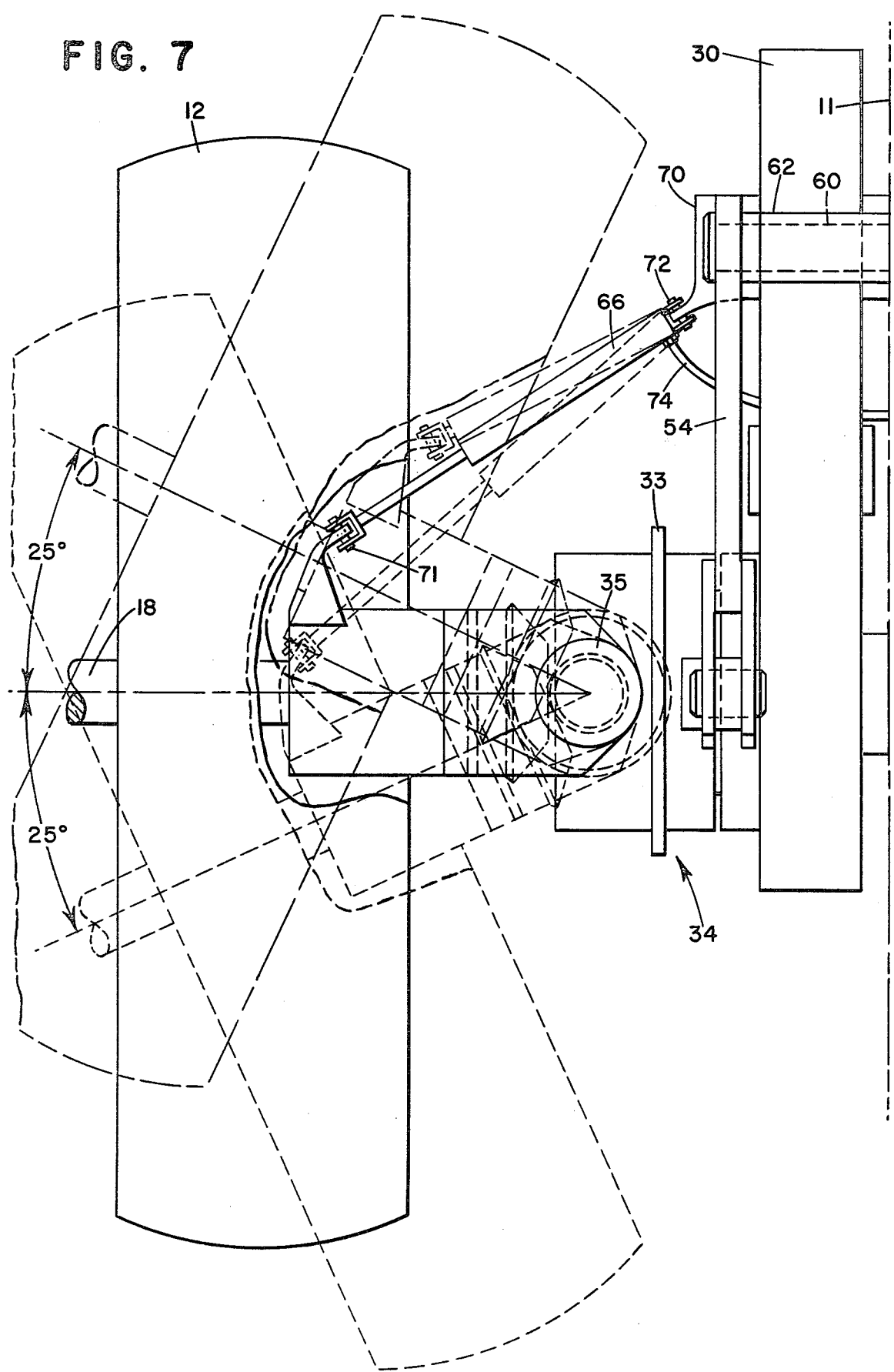

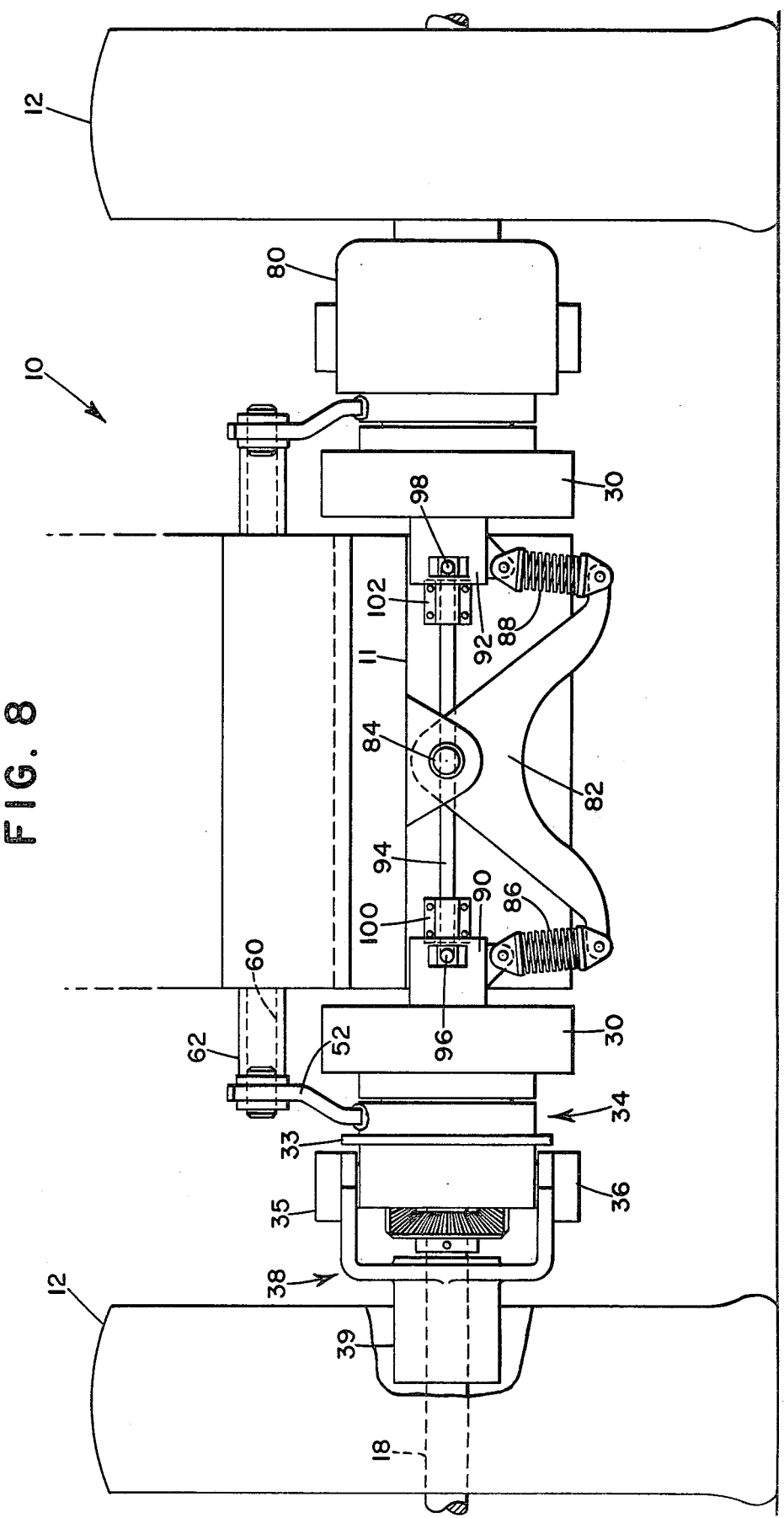

VEHICULAR STEERING AND SUSPENSION SYSTEM

BACKGROUND OF THE INVENTION

1. Field of the Invention

This invention relates to a vehicular steering and suspension system and more particularly to a steering and suspension system for use on heavy duty, off-road type vehicles.

2. Description of the Prior Art

Various kinds of steering and suspension systems have been designed for off-road type vehicles, such as agricultural and industrial type tractors.

Presently, there are three primary types of structural configurations for the steering and suspension systems on large, heavy duty equipment. The first type utilizes a single rigid frame having one rigid and one pivotable axle. Attached to the pivotal axle is a steering mechanism for steering the vehicle. The second configuration also utilizes a single rigid frame but with two rigid axles. The wheels are then pivotably mounted on the ends of each of the rigid axles so as to be steerable. The steering motion is permitted by the use of an universal joint or a constant angular velocity joint at each wheel. Such joints, besides being very costly are capable of providing only a limited turning angle. The third principal configuration is the familiar articulated design in which two independent frames are pivotably joined together. The front frame has mounted to it an axle which can pivot vertically but which is normally not steerable. The rear frame contains a non-steerable rigid axle. The steering motion is provided by the interaction of the two frames at the pivoted joint.

All of the above-mentioned configurations exhibit some type of disadvantage which is overcome by the present invention. The first rigid frame-type experiences both vibration and load variation problems on the drive train as the vehicle traverses rough terrain. The second single rigid frame-type has a limited turning radius at each wheel due to the limits of the joints and also experiences force overloads on the various components as the vehicle moves over bumps and ridges. And lastly, the articulated design has an inherent tendency to raise one of its wheels off the ground as the vehicle rides over irregular ground. This produces a jerky action wherein variable torque forces impinge on the drive train as the free wheel again contacts the ground. These and other problems are eliminated by the present invention.

SUMMARY OF THE INVENTION

The general object of this invention is to provide a vehicular steering and suspension system. A more specific object of this invention is to provide a steering and suspension system for use on heavy duty, off-road type vehicles.

Another object of this invention is to provide a vehicular steering and suspension system which minimizes the torque forces which can impinge on the drive train as the vehicle traverses over rough terrain.

Still another object of this invention is to provide a vehicular steering and suspension system which will reduce the amount of vibration in the vehicle as it moves over irregular terrain.

A further object of this invention is to provide a vehicular steering and suspension system which avoids the use of constant angular velocity joints in the kinematic chain.

Still further, an object of this invention is to provide a vehicular steering and suspension system which allows additional torque to be transmitted from the engine to each of the wheels because fewer torque peaks are transmitted back into the drive train.

Briefly, this invention relates to a vehicular steering and suspension system for use on heavy duty, agricultural and industrial type tractors. This steering and suspension system is comprised of several elements associated with each wheel. The first element is a gear train made up of three gears: an input gear, an intermediate gear and an output gear. The input gear is mounted on one end of a driven output shaft which is connected to the power train of the vehicle. Typically, there is a driven output shaft for each drive wheel of the vehicle. The output gear is drivenly connected to the input gear by the intermediate gear. This output gear is mounted on an outward extending shaft which is retained in position by a gear case which surrounds the entire gear train.

Other elements include an axle. The axle and the outward extending shaft are connected together by a tubular hub and the yoke. The tubular hub is attached to the outer portion of the gear case and shares the same axis as that of the outward extending shaft. The tubular hub has two oppositely aligned cylindrical knobs which support the yoke. The yoke is pivotally connected to the two cylindrical knobs by two arms which unite to form a hollow cylindrical portion which rotatably encircles the axle. This yoke is also connected to an actuating means, which is supported by the frame of the vehicle, for pivoting the yoke and thereby steering each wheel.

Positioned within the space defined by the tubular hub and the yoke are two pairs of intermeshing bevel gears. One pair of the bevel gear is mounted to an end of the axle and to an end of the outward extending shaft. The second pair of bevel gears is rotatably supported by the tubular hub and share the same axis as the two cylindrical knobs.

The system also includes first and second linkage arms which are pivotally attached together. The first linkage arm being securely attached at one end to the tubular hub and the second linkage arm being rotatably attached at one end to the vehicle's frame. Together, the two arms form two sides of a parallelogram with the remaining two sides being formed by the central axis of the gear train and an axis parallel to the first linkage arm which passes through the center of the driven output shaft. This parallelogram arrangement permits driving torque to be transmitted from the engine of the vehicle to the drive wheels so the vehicle can exert a pulling force on an attached implement and retain the steering axis is an upright attitude.

The suspension part of the system comprises a suspension means positioned between each pair of wheels. This suspension means includes a walking beam which is pivotally mounted at its midpoint to the frame and suspensionally attached at each end to the respective gear cases associated with each of the wheels. Also, a stabilizing bar is connected between each pair of gear cases to retard fluctuations between each pair of wheels as the vehicle traverses over uneven terrain.

Other objects and advantages of the present invention will become more apparent when considered in connection with the specification and the drawings.

BRIEF DESCRIPTION OF THE DRAWINGS

FIG. 6 is a top view of the front half of the tractor shown in FIG. 1 with the tractor frame shown in phantom to illustrate underside parts.

FIG. 7 is an enlarged view of the left side of FIG. 6 showing the wheel turned at different angles.

FIG. 8 is a front view of FIG. 1.

DETAILED DESCRIPTION OF THE INVENTION

Figure 1:
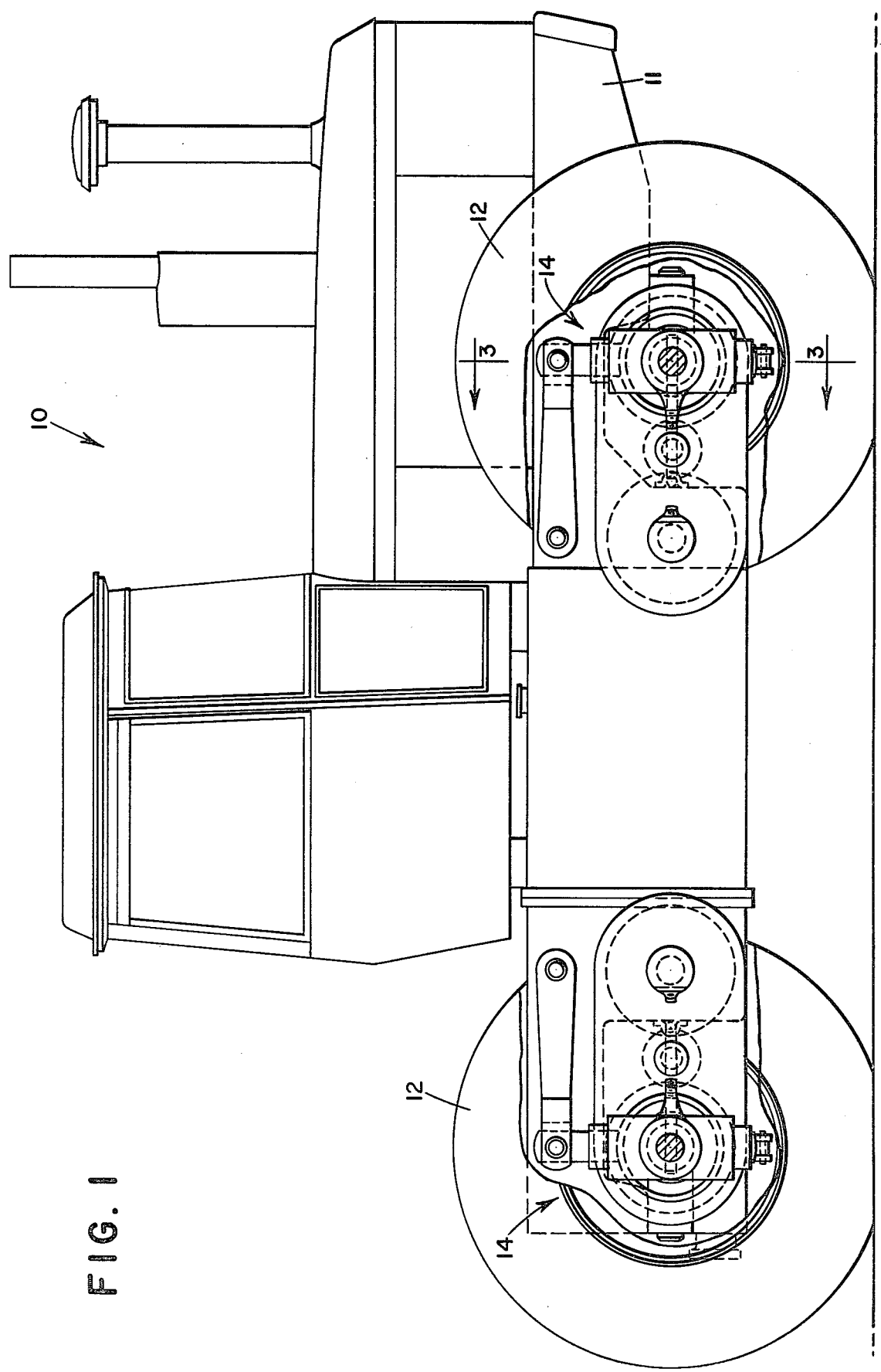
FIG. 1 is a side view of a tractor equipped with the steering and suspension system of this invention.

FIG. 1 shows an engine driven four-wheel driver tractor 10 having a rigid frame 11. Power is transferred from the engine of the tractor 10 through a differential (not shown) to drive wheels 12. Associated with each of the drive wheels 12 is a steering and suspension system 14. This system 14 is applicable to both two- and four-wheel drive vehicles.

Figure 2:
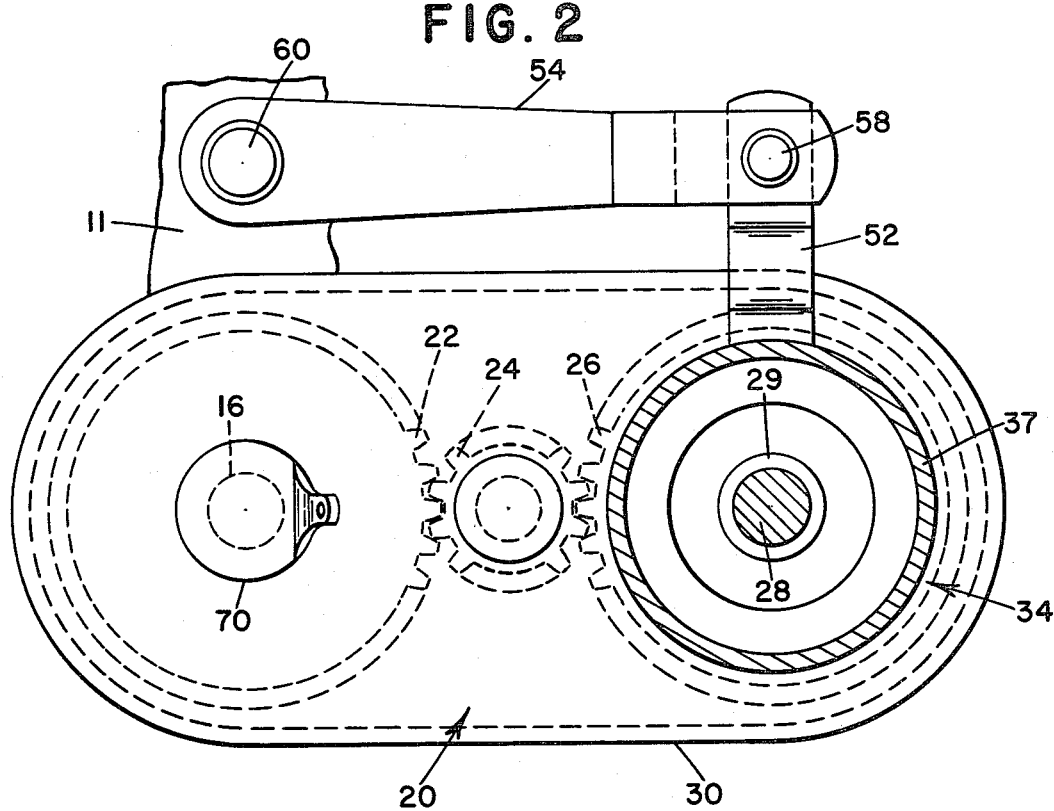
FIG. 2 is an enlarged view of the gear train as shown in the front half of FIG. 1 with the tubular hub broken away to show arm 52.
Figure 3:
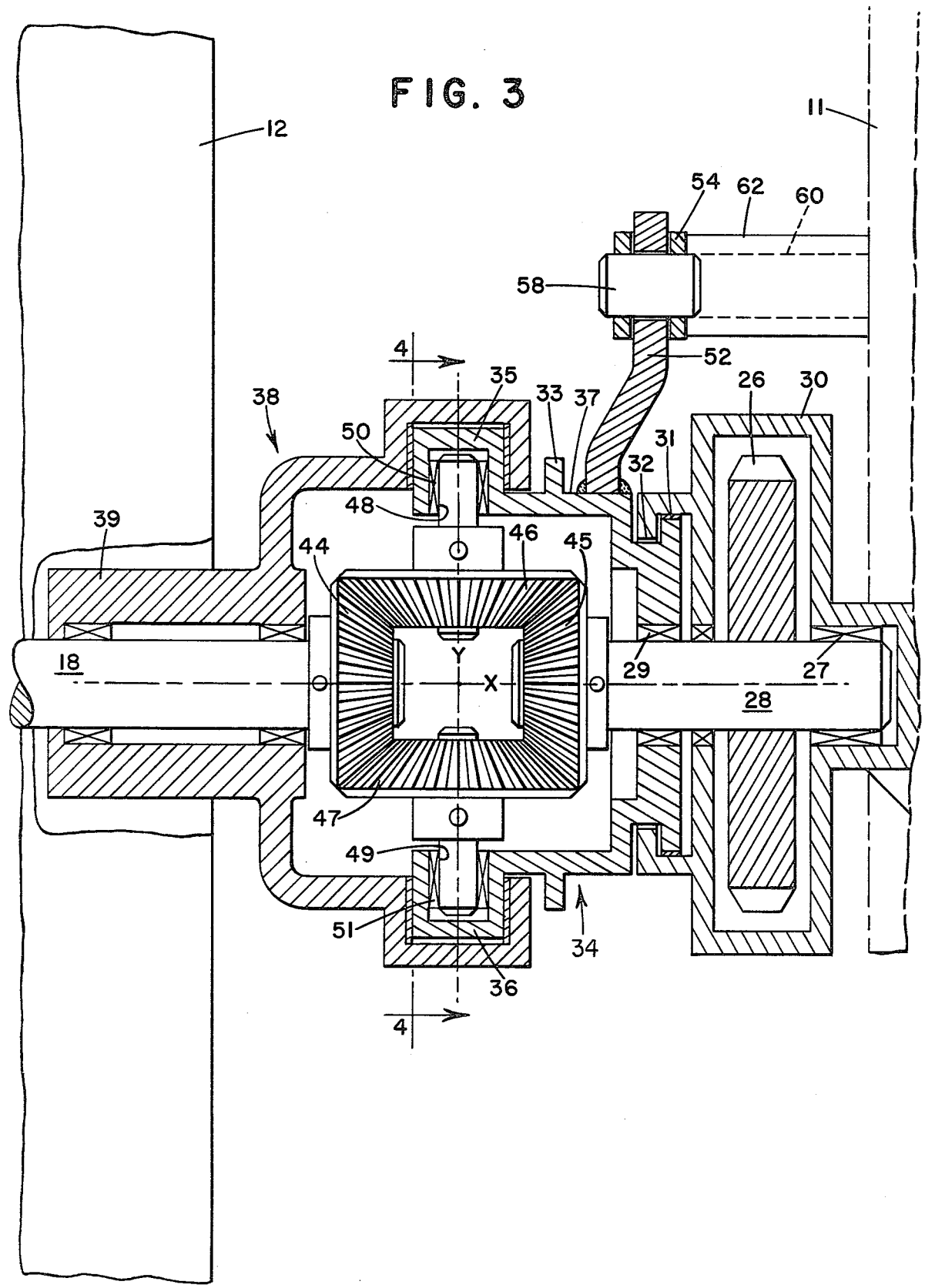
FIG. 3 is a sectional view of FIG. 1 as seen along the line 3—3.

Referring to FIGS. 2 and 3, the steering and suspension system 14 is connected to a driven output shaft 16 which extends out from the differential of the tractor 10. Each of the drive wheels 12 would be associated with a corresponding output shaft 16. Located between the output shaft 16 and an axle 18, on which each drive wheel 12 is mounted, is a gear train 20. This gear train 20 is made up of three intermeshing gears referred to as an input gear 22, an intermediate gear 24 and an output gear 26. The input gear 22 is mounted to the driven output shaft 16 while the output gear 26 is mounted to an outward extending shaft 28. Preferably the input gear 22 is equal in size to the output gear 26. The outward extending shaft 28 is rotatably carried by bearings 27 in a gear case 30. The gear case 30, which is pivotally attached to the driven output shaft 16, surrounds the gear train 20 and includes a circular lip 32. The circular lip 32 is concentrically positioned about the axis of the outward extending shaft 28 and provides support for a tubular hub 34.

Figure 4:
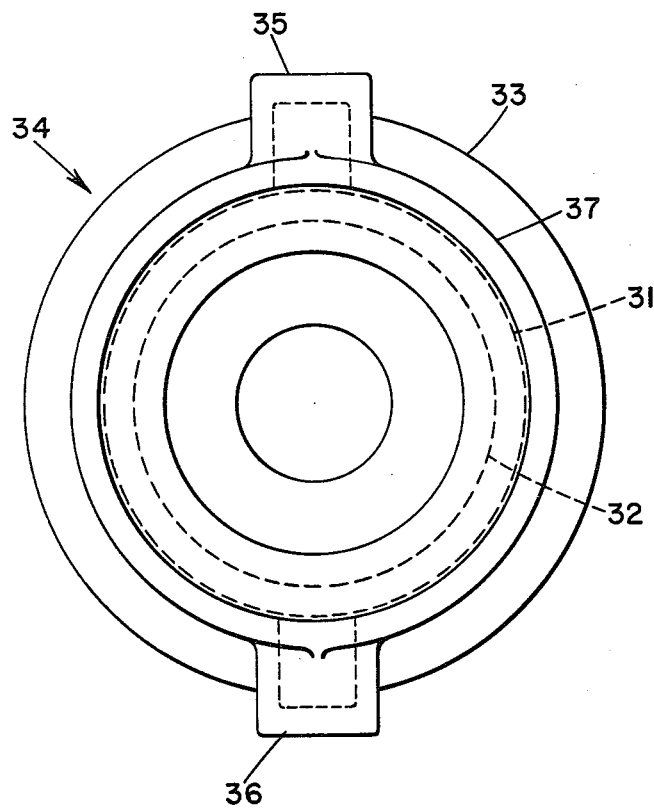
FIG. 4 is a view of FIG. 3 as seen along the line 4—4 showing the tubular hub only.

The tubular hub 34 is rotatably mounted by bearings 29 and 31 to both the outward extending shaft 28 and to the circular lip 32. This tubular hub 34, better seen in FIG. 4, contains a pair of oppositely aligned cylindrical knobs 35 and 36 on an outer peripheral surface 37. The axis of the two cylindrical knobs 35 and 36 preferably lies perpendicular to the axis of the axle 18.

Attached to the outer peripherial surface 37 of the tubular hub 34 is a projection or shoulder 33. This projection or shoulder 33 serves as a retaining means for holding a dust cover 80 (see FIG. 6) which extends outward toward the axle 18. This dust cover 80 can be constructed of any flexible material, such as natural or synthetic rubber, and can be of a smooth or an irregular shape, for example, bellow shaped. Preferably, the dust cover 80 is a smooth-shaped article made from a stretchable rubberlike material.

Figure 5:
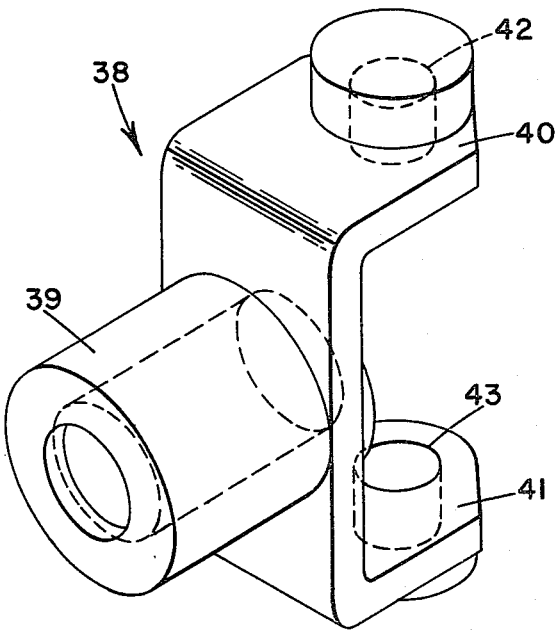
FIG. 5 is a perspective view of the yoke.

Connecting the axle 18 to the tubular hub 34 is a yoke 38, best seen in FIG. 5. This yoke 38 is comprised of a hollow cylindrical portion 39 and two outwardly extending arms 40 and 41. The hollow cylindrical portion 39 encircles and rotationally supports the axle 18 while the two arms 40 and 41 are engageably attached to the two cylindrical knobs 35 and 36 of the tubular hub 34. The attachment is by apertures 42 and 43 constructed in the arms 40 and 41, respectively. This method of attachment allows the yoke 38 to pivot with respect to the tubular hub 34 about the axis of the cylindrical knobs 35 and 36. This pivoting motion provides one of the degrees of freedom which is the steering of the drive wheel 12. Therefore, by steerably connecting the yoke 38 to the tubular hub 34, the operator can turn the tractor 10.

Positioned within the space created by joining the yoke 38 to the tubular hub 34 are two pairs of intermeshing bevel gears, wherein the gears are denoted as 44, 45, 46 and 47. These four gears 44, 45, 46 and 47 can be of equal size but preferably, the gears 44 and 45 are smaller than gears 46 and 47. By making the gears 44 and 45 smaller than the gears 46 and 47, the drive wheel 12 and attached axle 18 can turn through a greater angle relative to the outward extending shaft 28. When the gears 46 and 47 are considerably larger than the gears 44 and 45, and when the design of the various components permits it, the drive wheel 12 could be turned ±90° from its normal position. By normal position is meant that the drive wheel 12 is approximately parallel to the longitudinal axis of the tractor 10.

The gears 44 and 45 are parallel and concentrically aligned to each other, with the gear 44 being mounted on an end of the axle 18 and the gear 45 being mounted on an end of the outward extending shaft 28. The two gears 46 and 47 of the second set are aligned perpendicular to the two gears 44 and 45 of the first set and also share the same axis as the two cylindrical knobs 35 and 36. These two gears 46 and 47 are mounted on auxiliary shafts 48 and 49, respectively, which are rotatably supported on the inner surfaces 50 and 51 of the two cylindrical knobs 35 and 36, respectively.

The arrangement of the four gears 44, 45, 46 and 47 provides means for transmitting rotational motion from the outward extending shaft 28 to the axle 18. This rotational motion creates a second degree of freedom for the drive wheel 12 wherein the drive wheel 12 is capable of both rotating about the X-axis and turning with respect to the Y-axis. These two degrees of freedom are possible for each drive wheel 12 without utilizing any type of angular velocity joints, such as universal joints.

Referring once again to FIG. 2, the steering and suspension system 14 utilizes a first and a second linkage arm 52 and 54, respectively, for each drive wheel 12. The first linkage arm 52 is securely attached at one end to the outer peripheral surface 37 of the tubular hub 34, and is perpendicularly aligned to the longitudinal axis of the outward extending shaft 28. The other end of the first linkage arm 52 is pivotally attached to an end of the second linkage arm 54. A pin 58 provides the pivotable connection. The opposite end of the second linkage arm 54 is rotatably attached to the frame 11 by a shaft 60. Surrounding this shaft 60 is a hollow sleeve 62 (see FIG. 3) which helps to retain the second linkage arm 54 in a spaced apart relationship from the frame 11. Other types of spacers, such as retaining rings, snap rings, lock washers and the like can also be used.

The purpose for movably attaching the first and second linkage arms 52 and 54, respectively, is to allow them to move with the oscillation of the tubular hub 34.

As the tractor 10 traverses over the ground, the first linkage arm 52 prevents rotation of the tubular hub 34 so that torque can be transmitted from the engine of the tractor 10 to the drive wheels 12. Furthermore, the second linkage arm 54 always retains the axis of steering which passes through the center of the gears 46 and 47 in a vertical attitude.

Referring to FIG. 6, an extendible and retractable actuator 66 is positioned between the drive wheel 12 and the frame 11. This actuator 66 can be mechanically or hydraulically operated. As shown, the actuator 66 is attached at one end by connector 68 to the hollow cylindrical portion 39 of the yoke 38. The other end of the actuator 66 is attached by connector 70 to the gear case 30 in alignment to the driven output shaft 16, see FIG. 2. The actuator 66 is removably attached to connector 68 and 70 by fasteners 71 and 72, respectively. A conduit 74, attached to the actuator 66, serves as a passageway for the flow of a medium, such as hydraulic oil, to and from a reservoir (not shown) mounted on the frame 11.

FIG. 7 is an enlarged view of the drive wheel 12 shown in three positions, one being a standard position wherein the drive wheel 12 is parallel to the frame 11, and the other two positions showing the wheel 12 turned ±25° from the standard position. The steering and suspension system 14 of this invention is capable of turning the drive wheel 12 approximately ±90° from its standard position provided no obstructions are present between component parts or between the frame 11 and the drive wheel 12. The only limitation on turning is the physical contacting of gear 44 with the gear 45. As the drive wheel 12 is turned, the gear 44 will rotate on the two bevel gears 46 and 47 and will approach the gear 45. Contact between the gear 44 and the gear 45 should be avoided to prevent damage to the system.

The suspension portion of this system 14, see FIG. 8, includes a walking beam 82, positioned between each pair of coaxially aligned drive wheels 12. The walking beam 82, which is preferably arc-shaped in configuration, is pivotally mounted approximate its midpoint to the frame 11. As shown, the walking beam 82 is attached at its center to the underside of the frame 11 by a pin 84 and has each end connected to suspension means 86 and 88. These suspension means 86 and 88, which can be springs, shock absorbers, etc., are connected to inner abutments 90 and 92 of the gear cases 30. The purpose of the walking beams 82 is to average out the difference in vertical movement of each drive wheel 12 with respect to the tractor 10.

The suspension portion also includes a stabilizing bar 94 positioned between each pair of coaxially aligned drive wheels 12. The stabilizing bar 94 is a solid circular bar, preferably U-shaped in configuration. The two ends of the stabilizing bar 94 are securely held in apertures 96 and 98 located in the abutments 90 and 92, respectively, while the middle of the stabilizing bar 94 is rotatably held to the frame 11 by brackets 100 and 102. As the tractor 10 is driven over the ground, the drive wheels 12 will move up and down as they follow the contour of the land and the stabilizing bar 94 will tend to equalize the position of the two adjacent drive wheels 12 with respect to the frame 11.

It should be noted that the walking beam 82 and the stabilizing bar 94 are only needed between two coaxially aligned drive wheels 12. Therefore, on a two-wheel drive tractor, only one of each is needed.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. In a vehicle having a frame, a differential, a pair of power shafts which extend coaxially and laterally outward from opposite sides of said differential, and a pair of drive wheels, a steering and suspension system comprising:
   (a) an elongated gear case pivotally supported at one end on each of said power shafts;
   (b) a gear train contained within each of said gear cases including an input gear fixed to said power shaft, an output gear, and an intermediate gear meshing with both said input and said output gear;
   (c) a drive shaft extending laterally outward from a second end of each of said gear cases, said drive shaft supporting said output gear;
   (d) a first support member movably mounted to said second end of each of said gear cases, said support member coaxially aligned with said drive shaft;
   (e) a second support member pivotally mounted on each of said first support members for movement about a steering axis;
   (f) support means for maintaining the steering axis in a fixed direction with respect to said frame, said support means including first and second arms, said first arm extending outward from said first support member and said second arm pivotally connected at its ends to said first arm and to said frame;
   (g) an axle connecting each of said drive wheels to each of said respective second support member;
   (h) bevel gears adjacently mounted on an end of each of said drive shafts and on an end of each of said axles;
   (i) a pair of idler gears rotatably mounted on each of said first support members for rotation concentric about said steering axis, said pair of idler gears meshing with said bevel gears; and
   (j) extending and retracting control means joining each of said second support members to said frame for moving said second support members about said steering axis and thereby angularly turning said drive wheels with respect to said frame.

2. A steering and suspension system for a vehicle having a frame, an engine, at least two drive wheels, a power train connected to said engine and rotatably attached to each of said drive wheels by a driven output shaft, said system comprising:
   (a) a gear train associated with each of said drive wheels, each gear train having an input gear, an intermediate gear and an output gear, said input gear being mounted on one of said driven output shafts;
   (b) a gear case surrounding each of said gear trains, said gear case supporting an outward extending shaft and having an outwardly extending circular lip concentrically positioned about the axis of said outward extending shaft, said outward extending shaft having said output gear mounted thereon;
   (c) an axle revolvably supporting each of said drive wheels;

(d) a tubular hub rotatably mounted to both said circular lip on said gear case and said outward extending shaft, said tubular hub having a pair of externally positioned and oppositely aligned cylindrical knobs which have a steering axis perpendicular to the longitudinal axis of said outward extending shaft;

(e) a yoke connected between said axle and said tubular hub, said yoke having a hollow cylindrical portion and two arms extending angularly outward therefrom, said hollow cylindrical portion encircling said axle and each of said two arms containing an aperture engageable with one of said oppositely aligned cylindrical knobs for pivoting said yoke with respect to said tubular hub about the steering axis of said two cylindrical knobs;

(f) two pairs of intermeshing bevel gears connecting each of said axles to said respective outwardly extending shaft, the gears of one pair being mounted on an end of said axle and on an end of said outwardly extending shaft and the gears of the second pair being supported within said tubular hub for rotation about the steering axis of said cylindrical knobs;

(g) a first linkage arm securely attached at one end to said tubular hub, said first linkage arm having an axis perpendicular to said axis of said outward extending shaft;

(h) a second linkage arm, rotatably attached at one end to an end of said first linkage arm and being rotatably attached at the other end to said frame, said first and second linkage arms forming two adjacent sides of a parallelogram with the remaining two sides being formed by a central axis of said gear train and an axis parallel to said first linkage arm which passes through the center of said respective driven output shaft;

(i) actuating means movably connected between said yoke and said frame for pivoting said drive wheel about the steering axis of said cylindrical knobs;

(j) a walking beam positioned between each pair of coaxially aligned drive wheels, said walking beam pivotally attached to said frame;

(k) suspension means for attaching said walking beam to said gear cases; and (l) stabilizing means positioned between each pair of coaxially aligned gear cases for equalizing the position of two adjacent drive wheels with respect to said frame.

3. The system of claim 2 wherein said input gear and said output gear of said gear train are of equal size.

4. The system of claim 2 wherein said intermediate gear of said gear train is smaller than said input gear.

5. The system of claim 2 wherein two pairs of intermeshing bevel gears are of equal size.

6. The system of claim 2 wherein one pair of said bevel gears are larger than said other pair of bevel gears.

7. The system of claim 2 wherein a dust cover is positioned over each of said yokes.

8.

9. The system of claim 7 wherein said dust cover has a smooth outer surface.

10. The system of claim 2 wherein said first and second linkage arms are pivotally pinned together.

11. The system of claim 2 wherein said actuating means is a hydraulically activated mechanism.

12. The system of claim 2 wherein said suspension means are springs.

13. The system of claim 2 wherein said walking beam is arc-shaped.

14. The system of claim 13 wherein said arc-shaped walking beam is pinned to said frame.

15. A steering and suspension system for a vehicle having a frame, a differential and a pair of power shafts extending outwardly from opposite sides of said differential, said steering and suspension system comprising:

(a) gear cases pivotally supported at one end on each of said power shafts;

(b) gear trains having at least three intermeshing gears contained within each of said gear cases;

(c) drive shafts extending outwardly from a second end of each of said gear cases, each of said drive shafts supporting one of said intermeshing gears;

(d) first support members movably mounted to said second end of said gear cases and coaxially aligned with said drive shafts;

(e) second support members pivotally mounted on each of said first support members for movement about a steering axis;

(f) support means for maintaining the steering axis in a fixed direction with respect to said frame, said support means including first and second arms, said first arms extending outward from each of said first support members and said second arms pivotally connected at its ends to one of said first support arms and said frame;

(g) axles supported by said second support members and coaxially aligned with the axes of said drive shafts;

(h) two pairs of intermeshing gears connecting each of said axles to said respective drive shafts, one pair of said gears being mounted on both an end of said axle and an end of said drive shaft and the other pair of said gears being supported by said first support member for rotation thereabout; and (i) control means joining each of said second support members to said frame for moving said second support members about the steering axis and thereby angularly turning said axles with respect to said frame.

16. A steering and suspension system for a vehicle, said vehicle having a frame, a differential, a pair of power shafts extending laterally outward from opposite sides of said differential, and a pair of drive wheels, said steering and suspension system comprising:

(a) an elongated gear case pivotally supported at one end on each of said power shafts;

(b) a gear train contained within each of said gear cases, said gear train including an input gear fixed to said power shaft, an output gear, and an intermediate gear joining said input gear to said output gear;

(c) a drive shaft extending laterally outward from a second end of each of said gear cases, said drive shaft supporting said output gear;

(d) a hub mounted on each of said drive shafts and extending outward therefrom, each of said hubs having a pair of cylindrical knobs with an axis aligned perpendicular to the axis of said respective drive shaft;

(e) a yoke pivotally mounted to said pair of cylindrical knobs on each of said hubs for permitting said yoke to pivot about the axis of said pair of cylindrical knobs;

(f) support means for maintaining the axis between each of said hubs and yokes in a fixed direction with respect to said frame, each of said support means including first and second arms, said first arm extending outward from said hub and said second arm pivotally connected at its ends to said first arm and to said frame;

(g) an axle connecting each of said yokes to said respective drive wheels;

(h) two pairs of intermeshing gears connecting each of said axles to said respective drive shaft, one pair of said gears being mounted on both an end of said axle and an end of said drive shaft and the other pair of said gears being supported by said hub for rotation about the axis of said cylindrical knobs; and (i) control means for pivotally moving each of said yokes about the axis of said pair of cylindrical knobs of said respective hub thereby permitting said drive wheels to turn with respect to said frame.

17. The steering and suspension system of claim 16 wherein said hubs are tubular.

18. The steering and suspension system of claim 16 wherein one pair of said intermeshing gears are larger than said other pair.

19. The steering and suspension system of claim 16 wherein said two pairs of intermeshing gears are of equal size.

20. The steering and suspension system of claim 16 wherein said intermeshing gears are bevel gears.

21. The steering and suspension system of claim 16 wherein a dust cover is positioned about each of said yokes.

22. The steering and suspension system of claim 16 wherein said dust cover is flexible.

23. The steering and suspension system of claim 16 wherein said dust cover has a smooth outer surface.

* * * * *